(12) United States Patent
Yadin et al.

(10) Patent No.: US 11,360,330 B2
(45) Date of Patent: Jun. 14, 2022

(54) TUNABLE LENSES FOR SPECTACLES

(71) Applicant: OPTICA AMUKA (A.A.) LTD., Petach Tikva (IL)

(72) Inventors: Yoav Yadin, Ganey Tikva (IL); Yariv Haddad, Raanana (IL); Shamir Rosen, Ramat Gan (IL); Aviezer Ben-Eliyahu, Zur-Hadassa (IL)

(73) Assignee: OPTICA AMUKA (A.A.) LTD., Petach Tikva (IL)

( * ) Notice: Subject to any disclaimer, the term of this patent is extended or adjusted under 35 U.S.C. 154(b) by 225 days.

(21) Appl. No.: 16/085,581

(22) PCT Filed: Jun. 13, 2017

(86) PCT No.: PCT/IB2017/053492
§ 371 (c)(1),
(2) Date: Sep. 16, 2018

(87) PCT Pub. No.: WO2017/216716
PCT Pub. Date: Dec. 21, 2017

(65) Prior Publication Data
US 2019/0113772 A1  Apr. 18, 2019

Related U.S. Application Data

(60) Provisional application No. 62/350,723, filed on Jun. 16, 2016.

(51) Int. Cl.
*G02C 7/08* (2006.01)
*B29D 11/00* (2006.01)
(Continued)

(52) U.S. Cl.
CPC ........ *G02C 7/083* (2013.01); *B29D 11/00817* (2013.01); *G02C 7/12* (2013.01);
(Continued)

(58) Field of Classification Search
CPC .......... G02C 7/083; G02C 7/12; G02C 7/081; G02C 7/085; G02C 7/088;
(Continued)

(56) References Cited

U.S. PATENT DOCUMENTS 3,580,661 A  5/1971 Cooper, Jr. et al.
3,881,921 A  5/1975 Frank
(Continued)

FOREIGN PATENT DOCUMENTS

CN  201752480 U  3/2011
CN  102253563 A  11/2011
(Continued)

OTHER PUBLICATIONS

International Application # PCT/IB2018/057841 search report dated Jan. 15, 2019.
(Continued)

*Primary Examiner* — Travis S Fissel
(74) *Attorney, Agent, or Firm* — Kligler & Associates Patent Attorneys Ltd (57) ABSTRACT

Optical apparatus (20) includes a transparent envelope (26) configured to be mounted in a spectacle frame. An electro-optical layer (46) is contained within the envelope, with an array of transparent excitation electrodes (50) disposed over a first surface of the transparent envelope. A transparent common electrode (52) is disposed over a second surface of the transparent envelope, opposite the first surface, and is electrically separated into a central region defining an active area (24) of the electro-optical layer and a peripheral region, which at least partially surrounds the central region. Control circuitry (72, 82, 92) holds the central region of the transparent common electrode at a predefined common voltage while allowing the peripheral region to float electrically, and to apply control voltage waveforms to the excitation elec- (Continued)

trodes, relative to the common voltage, so as to generate a specified phase modulation profile in the active area of the electro-optical layer.

44 Claims, 6 Drawing Sheets

(51) Int. Cl.
*G02F 1/1343* (2006.01)
*G02C 7/12* (2006.01)
*G02F 1/01* (2006.01)

(52) U.S. Cl.
CPC .......... *G02F 1/0121* (2013.01); *G02F 1/1343* (2013.01); *G02F 2203/28* (2013.01)

(58) Field of Classification Search
CPC .......... B29D 11/00817; B29D 11/0074; B29D 11/00807; G02F 1/0121; G02F 1/1343; G02F 2203/28
USPC .......................................... 351/159.39, 159.4
See application file for complete search history.

(56) References Cited

U.S. PATENT DOCUMENTS

| | | | |
|---|---|---|---|
| 4,190,330 A | 2/1980 | Berreman et al. | |
| 4,300,818 A | 11/1981 | Schachar | |
| 4,584,592 A | 4/1986 | Tuan et al. | |
| 4,853,764 A | 8/1989 | Sutter | |
| 5,073,021 A | 12/1991 | Marron | |
| 5,212,583 A | 5/1993 | Vali et al. | |
| 5,359,444 A | 10/1994 | Piosenka et al. | |
| 5,757,546 A | 5/1998 | Lipton et al. | |
| 5,815,233 A | 9/1998 | Morokawa et al. | |
| 5,861,936 A | 1/1999 | Sorensen | |
| 5,861,940 A | 1/1999 | Robinson et al. | |
| 6,152,563 A | 11/2000 | Hutchinson et al. | |
| 6,243,063 B1 | 6/2001 | Mayhew et al. | |
| 6,501,443 B1 | 12/2002 | McMahon | |
| 6,517,203 B1 | 2/2003 | Blum et al. | |
| 6,553,504 B1* | 4/2003 | Katzenelson ............. G06F 1/10 713/401 |
| 6,857,741 B2 | 2/2005 | Blum et al. | |
| 6,986,579 B2 | 1/2006 | Blum et al. | |
| 7,475,984 B2 | 1/2009 | Blum et al. | |
| 7,475,985 B2 | 1/2009 | Blum et al. | |
| 7,497,121 B2 | 3/2009 | Okuda et al. | |
| 7,517,083 B2 | 4/2009 | Blum et al. | |
| 7,600,872 B2 | 10/2009 | Esser et al. | |
| 7,728,949 B2 | 6/2010 | Clarke et al. | |
| 8,052,278 B2 | 11/2011 | Bovet et al. | |
| 8,675,148 B2 | 3/2014 | Takagi et al. | |
| 8,773,629 B2 | 7/2014 | Uehara et al. | |
| 8,896,772 B2 | 11/2014 | Fraval et al. | |
| 8,922,902 B2 | 12/2014 | Blum et al. | |
| 9,052,514 B2 | 6/2015 | Takama | |
| 9,241,669 B2 | 1/2016 | Pugh et al. | |
| 9,304,319 B2 | 4/2016 | Bar-Zeev et al. | |
| 9,541,774 B2 | 1/2017 | Machida et al. | |
| 9,958,703 B2 | 5/2018 | Pugh et al. | |
| 10,268,050 B2 | 4/2019 | To et al. | |
| 2002/0044125 A1 | 4/2002 | Maltese | |
| 2003/0128416 A1 | 7/2003 | Caracci et al. | |
| 2003/0210377 A1 | 11/2003 | Blum et al. | |
| 2003/0231293 A1* | 12/2003 | Blum ................ G02F 1/133371 356/5.01 |
| 2004/0041745 A1 | 3/2004 | Chen | |
| 2004/0160389 A1 | 8/2004 | Suyama | |
| 2004/0169630 A1 | 9/2004 | Ide | |
| 2005/0146495 A1 | 7/2005 | MacKinnon et al. | |
| 2005/0162367 A1 | 7/2005 | Kobayashi et al. | |
| 2005/0168430 A1 | 8/2005 | Nishimura et al. | |
| 2006/0034003 A1 | 2/2006 | Zalevsky | |
| 2006/0092340 A1 | 5/2006 | Blum et al. | |
| 2006/0126698 A1 | 6/2006 | Blum et al. | |
| 2006/0164593 A1 | 7/2006 | Peyghambarian et al. | |
| 2006/0164687 A1 | 7/2006 | Huang et al. | |
| 2007/0052876 A1 | 3/2007 | Kaufman et al. | |
| 2007/0146873 A1 | 6/2007 | Ortyn et al. | |
| 2007/0236769 A1 | 10/2007 | Zalevsky | |
| 2007/0236800 A1 | 10/2007 | Cakmakci et al. | |
| 2007/0280626 A1 | 12/2007 | Haddock et al. | |
| 2007/0290972 A1* | 12/2007 | Meredith .......... G02F 1/134309 345/90 |
| 2009/0237575 A1 | 9/2009 | Tsi-shi | |
| 2009/0279050 A1 | 11/2009 | McGinn et al. | |
| 2010/0007804 A1 | 1/2010 | Guncer | |
| 2010/0026920 A1 | 2/2010 | Kim et al. | |
| 2010/0149444 A1* | 6/2010 | Hikmet ................ G02F 1/29 349/15 |
| 2010/0157181 A1* | 6/2010 | Takahashi ............ H04N 13/305 349/33 |
| 2011/0018903 A1 | 1/2011 | Lapstun et al. | |
| 2011/0037837 A1 | 2/2011 | Chiba et al. | |
| 2011/0228181 A1 | 9/2011 | Jeong et al. | |
| 2011/0234934 A1 | 9/2011 | Chang | |
| 2011/0317128 A1 | 12/2011 | Guilloux et al. | |
| 2012/0099040 A1 | 4/2012 | Robinson et al. | |
| 2012/0120333 A1 | 5/2012 | Chen et al. | |
| 2012/0133891 A1 | 5/2012 | Jiang | |
| 2012/0147038 A1 | 6/2012 | Perez et al. | |
| 2012/0194781 A1 | 8/2012 | Agurok | |
| 2012/0212696 A1 | 8/2012 | Trajikovska et al. | |
| 2012/0300171 A1 | 11/2012 | Gupta et al. | |
| 2013/0027655 A1 | 1/2013 | Blum et al. | |
| 2013/0208224 A1 | 8/2013 | Kizu et al. | |
| 2013/2008224 | 8/2013 | Kizu et al. | |
| 2013/0250193 A1 | 9/2013 | Yun et al. | |
| 2013/0250223 A1 | 9/2013 | Takagi et al. | |
| 2014/0036172 A1 | 2/2014 | Trajkovska-Broach et al. | |
| 2014/0036183 A1 | 2/2014 | Asatryan et al. | |
| 2014/0118644 A1 | 5/2014 | Liu et al. | |
| 2014/0347405 A1 | 11/2014 | Kumeta et al. | |
| 2015/0116304 A1 | 4/2015 | Lee et al. | |
| 2015/0185503 A1 | 7/2015 | Tate et al. | |
| 2015/0219893 A1 | 8/2015 | Chen et al. | |
| 2015/0277151 A1 | 10/2015 | Yadin et al. | |
| 2015/0378240 A1* | 12/2015 | Wang .................. G02F 1/29 349/33 |
| 2016/0004128 A1 | 1/2016 | Wu | |
| 2016/0161767 A1 | 6/2016 | Childers | |
| 2017/0068134 A1 | 3/2017 | Yadin et al. | |
| 2017/0160440 A1 | 6/2017 | Yadin et al. | |
| 2017/0160518 A1 | 6/2017 | Lanman et al. | |
| 2017/0184848 A1 | 6/2017 | Vallius | |
| 2017/0219828 A1 | 8/2017 | Tsai et al. | |
| 2017/0269453 A1 | 9/2017 | Galstian et al. | |
| 2017/0276963 A1 | 9/2017 | Brennan et al. | |

FOREIGN PATENT DOCUMENTS

| | | |
|---|---|---|
| EP | 0595705 A1 | 5/1994 |
| EP | 1050775 A1 | 11/2000 |
| EP | 1760515 A2 | 3/2007 |
| EP | 2309310 A1 | 4/2011 |
| EP | 2503787 A1 | 9/2012 |
| EP | 2682810 A1 | 1/2014 |
| JP | S62209412 A | 9/1987 |
| JP | H0289017 A | 3/1990 |
| JP | H036518 A | 1/1991 |
| JP | 2003091013 A | 3/2003 |
| JP | 2011203457 A | 10/2011 |
| JP | 2012141552 A | 7/2012 |
| RU | 2541819 C2 | 2/2015 |
| WO | 8102795 A1 | 10/1981 |
| WO | 9941639 A1 | 8/1999 |
| WO | 03077012 A2 | 9/2003 |
| WO | 2008032061 A2 | 3/2008 |
| WO | 2011075834 A1 | 6/2011 |
| WO | 2012120470 A1 | 9/2012 |

(56) References Cited

FOREIGN PATENT DOCUMENTS

| WO | 2014063432 A1 | 5/2014 |
|---|---|---|
| WO | 2017003330 A1 | 1/2017 |
| WO | 2017158486 A1 | 9/2017 |

OTHER PUBLICATIONS

EP Application # 18213190.4 search report dated Feb. 14, 2019.
EP Application # 15761611.1 office action dated Feb. 13, 2019.
Indian Application #1664/CHENP/2015 Office Action dated Jan. 29, 2019.
Sensomotoric Instruments GMBH, "SMI Eye Tracking Glasses—Discover What is Seen", 2 pages, 2011.
Lensvector, "Breakthrough Autofocus Technology", 1 page, 2010.
Loktev et al., "Wave front control systems based on modal liquid crystal lenses", Review of Scientific Instruments, vol. 71, No. 9, pp. 3290-3297, Sep. 1, 2000.
Pixeloptics Inc., "The Evolution of Technology—emPower!—The world's First Electronic Focusing Eyewear", 1 page, 2009.
Brunosan., "Headaches in 3D", Saepe cadendo, 4 pages, Jan. 29, 2011.
Naumov et al., "Liquid-crystal adaptive lenses with modal control", Optics Letters, vol. 23, No. 13, pp. 992-994, Jul. 1, 1998.
Varioptic SA, "Liquid Lens for Auto Focus (AF)", 3 pages, Jul. 31, 2012.
Bagwell et al., "Liquid crystal based active optics", SPIE Proceedings Novel Optical Systems Design and Optimization IX, vol. 6289, 12 pages, Sep. 5, 2006.
Holoeye Photonics AG, "LC 2002: Translucent Spatial Light Modulator", 2 pages, May 12, 2012.
Varioptic SA, "The Liquid Lens Technology", 2 pages, Dec. 2, 2010.
Longtech Optics Co Ltd., "LCD Multiplex Ratio", 1 page, year 2008.
Stiefelhagen et al., "A Model-Based Gaze Tracking System", International Journal of Artificial Intelligence Tools, vol. 6, No. 2, pp. 193-209, year 1997.
Baluja et al., "Non-Intrusive Gaze Tracking Using Artificial Neural Networks", CMU Technical Report, CMU-CS-94-102; 14 pages, Jan. 5, 1994.
Jacob, R., "The Use Of Eye Movements In Human-Computer Interaction Techniques: What You Look At Is What You Get", ACM Transactions On Information Systems, vol. 9, No. 3, pp. 152-169, Apr. 1991.
Heinzmann et al., "3-D Facial Pose And Gaze Point Estimation Using A Robust Real-Time Tracking Paradigm", Proceedings of the Third International Conference on Automatic Face and Gesture Recognition, pp. 142-147, Apr. 14-16, 1998.
Wang et al., "Liquid crystal blazed grating beam deflector", Part of the SPIE Conference on Advanced OpticalMemories and Interfaces to Comouter Storage, San Diego, USA, vol. 3468, pp. 43-54, Jul. 1998.
Goodman, "Introduction to Fourier Optics", 3rd edition, published by Roberts & Company, year 2005.
Boulder Nonlinear Systems, "Spatial Light Modulators—XY Phase Series", 1 page, 2007.
Boulder Nonlinear Systems, "Spatial Light Modulators—XY Phase Series—draft Specifications", 1 page, 2007.
Holmarc Opto-Mechantronics PVT. LTD., "Lab Equipment for Research and Manufacturing", 24 pages (relevant p. 18 "Bench Top Rubbing Machine"), Jan. 23, 2015.
Yadin et al., U.S. Appl. No. 16/081,927, filed Sep. 3, 2018.
U.S. Appl. No. 15/310,798 office action dated Apr. 5, 2019.
EP Application # 15761611.1 office action dated May 28, 2019.
JP Application # 2016-569044 office action dated Apr. 24, 2019.
International Application # PCT/IB2019/056243 Search report dated Nov. 3, 2019.
JP Application # 2016-555831 office action dated Oct. 30, 2018.
U.S. Appl. No. 15/310,798 office action dated Oct. 4, 2018.
JP Application # 2016-569044 office action dated Oct. 3, 2018.
International Application # PCT/IB2018/054957 Search Report dated Nov. 28, 2018.
International Application # PCT/IB2020/054524 Search Report dated Aug. 31, 2020.
EP Application # 20199016.5 Search Report dated Nov. 30, 2020.
CA Application # 2,947,809 Office Action dated Apr. 19, 2021.
CA Application # 2,939,664 Office Action dated Apr. 20, 2021.
U.S. Appl. No. 16/566,910 Office Action dated Jun. 24, 2021.
EP Application # 18869416 Search Report dated Jun. 16, 2021.

\* cited by examiner

TUNABLE LENSES FOR SPECTACLES

CROSS-REFERENCE TO RELATED APPLICATION

This application claims the benefit of U.S. Provisional Patent Application 62/350,723, filed Jun. 16, 2016, which is incorporated herein by reference.

FIELD OF THE INVENTION

The present invention relates generally to optical devices, and particularly to electrically-tunable lenses.

BACKGROUND

Tunable lenses are optical elements whose optical characteristics, such as the focal length and/or the location of the optical axis, can be adjusted during use, typically under electronic control. Such lenses may be used in a wide variety of applications. For example, U.S. Pat. No. 7,475,985 describes the use of an electro-active lens for the purpose of vision correction.

Electrically-tunable lenses typically contain a thin layer of a suitable electro-optical material, i.e., a material whose local effective index of refraction changes as a function of the voltage applied across the material. An electrode or array of electrodes is used to apply the desired voltages in order to locally adjust the refractive index to the desired value. Liquid crystals are the electro-optical material that is most commonly used for this purpose (wherein the applied voltage rotates the molecules, which changes the axis of birefringence and thus changes the effective refractive index), but other materials, such as polymer gels, with similar electro-optical properties can alternatively be used for this purpose.

Some tunable lens designs use an electrode array to define a grid of pixels in the liquid crystal, similar to the sort of pixel grid used in liquid-crystal displays. The refractive indices of the individual pixels may be electrically controlled to give a desired phase modulation profile. (The term "phase modulation profile" is used in the present description and in the claims to mean the distribution of the local phase shifts that are applied to light passing through the layer as the result of the locally-variable effective refractive index over the area of the electro-optical layer of the tunable lens.) Lenses using grid arrays of this sort are described, for example, in the above-mentioned U.S. Pat. No. 7,475,985.

PCT International Publication WO 2014/049577, whose disclosure is incorporated herein by reference, describes an optical device comprising an electro-optical layer, having an effective local index of refraction at any given location within an active area of the electro-optical layer that is determined by a voltage waveform applied across the electro-optical layer at the location. An array of excitation electrodes, including parallel conductive stripes extending over the active area, is disposed over one or both sides of the electro-optical layer. Control circuitry applies respective control voltage waveforms to the excitation electrodes and is configured to concurrently modify the respective control voltage waveforms applied to excitation electrodes so as to generate a specified phase modulation profile in the electro-optical layer.

PCT International Publication WO 2015/186010, whose disclosure is incorporated herein by reference, describes adaptive spectacles, which include a spectacle frame and first and second electrically-tunable lenses, mounted in the spectacle frame. In one embodiment, control circuitry is configured to receive an input indicative of a distance from an eye of a person wearing the spectacles to an object viewed by the person, and to tune the first and second lenses in response to the input.

SUMMARY

Embodiments of the present invention that are described hereinbelow provide improved electrically-tunable optical devices and methods for control of such devices.

There is therefore provided, in accordance with an embodiment of the invention, optical apparatus, including a transparent envelope configured to be mounted in a spectacle frame and worn, in the spectacle frame, in front of an eye of a user of the apparatus. An electro-optical layer, contained within the envelope, has an effective local index of refraction at any given location that is determined by a voltage waveform applied across the electro-optical layer at the location. An array of transparent excitation electrodes is disposed over a first surface of the transparent envelope. A transparent common electrode is disposed over a second surface of the transparent envelope, opposite the first surface, and is electrically separated into a central region defining an active area of the electro-optical layer and a peripheral region, which at least partially surrounds the central region. Control circuitry is configured to hold the central region of the transparent common electrode at a predefined common voltage while allowing the peripheral region to float electrically, and to apply control voltage waveforms to the excitation electrodes, relative to the common voltage, so as to generate a specified phase modulation profile in the active area of the electro-optical layer.

In the disclosed embodiments, the phase modulation profile is specified so as to cause rays of optical radiation that are incident on the active area to converge or diverge with a specified focal power, and the electro-optical layer includes a liquid crystal.

In some embodiments, the transparent excitation electrodes include conductive stripes, which extend across both the central and peripheral regions. In one embodiment, the electro-optical layer includes first and second electro-optical layers contained within the envelope, and the conductive stripes include a first set of the stripes that extend in parallel across the first electro-optical layer in a first direction and a second set of the stripes, which extend in parallel across the second electro-optical layer in a second direction, which is perpendicular to the first direction.

Typically, the transparent common electrode includes a thin film, which is etched to separate the central region from the peripheral region.

There is also provided, in accordance with an embodiment of the invention, an optical device, including first and second transparent substrates in mutually parallel orientations. A liquid crystal layer is contained between the first and second transparent substrates and has an effective local index of refraction at any given location within an active area of the liquid crystal layer that is determined by a voltage waveform applied across the a liquid crystal layer at the location. A common electrode is positioned over the active area on the first transparent substrate. An array of excitation electrodes includes parallel conductive stripes extending over the active area on the second transparent substrate. An alignment layer is formed over an inner surface of at least the second transparent substrate and contains linear alignment structures in contact with the liquid crystal layer that are oriented at a 45° angle relative to the conductive stripes.

Control circuitry is configured to apply control voltage waveforms to the excitation electrodes, relative to the common electrode, so as to generate a specified phase modulation profile in the active area of the electro-optical layer.

In some embodiments, optical apparatus includes first and second devices as defined above, mounted in mutual proximity with the first and second transparent substrates of the first and second devices mutually parallel, wherein the second device is rotated, relative to the first device, so that the conductive stripes in the first and second devices are mutually perpendicular while the linear alignment structures in the alignment layer in the first device are parallel to the linear alignment structures in the alignment layer in the second device. In one embodiment, the second device is rotated relative to the first device by 180° about a first axis that is parallel to the conductive stripes and by 90° about a second axis that is perpendicular to the transparent substrates.

There is additionally provided, in accordance with an embodiment of the invention, optical apparatus, including a transparent envelope, which is configured to be mounted in a spectacle frame in a predefined orientation and worn, in the spectacle frame, in front of an eye of a user of the apparatus, and which curves about an axis that is vertical in the predefined orientation. An electro-optical layer is contained within the envelope and has an effective local index of refraction at any given location that is determined by a voltage waveform applied across the electro-optical layer at the location. An array of excitation electrodes includes parallel transparent conductive stripes extending across a surface of the transparent envelope in a direction parallel to the vertical axis over an active area of the electro-optical layer. At least one control chip is mounted on the transparent envelope in a location that is horizontally spaced away from the active area and is configured to generate control voltage waveforms for application to the electrodes. Conductive traces disposed on the transparent envelope connect the at least one control chip to ends of the conductive stripes so as to apply the control voltage waveforms to the electrodes.

In some embodiments, the conductive traces include transparent conductors disposed over the surface of the transparent envelope between the at least one control chip and the ends of the electrodes.

Additionally or alternatively, the conductive traces include first conductive traces connecting first terminals of the at least one control chip to respective upper ends of a first set of the conductive stripes and second conductive traces connecting second terminals of the at least one control chip to respective lower ends of a second set of the conductive stripes.

In a disclosed embodiment, the at least one control chip has rectangular shape having long and short sides and is mounted on the transparent envelope with the long sides parallel to the conductive stripes.

Further additionally or alternatively, the array of excitation electrodes includes further transparent conductive stripes connected to the at least one control chip and extending across the transparent envelope in a direction perpendicular to the vertical axis.

There is further provided, in accordance with an embodiment of the invention, optical apparatus, including a transparent envelope configured to be mounted in a spectacle frame and worn, in the spectacle frame, in front of an eye of a user of the apparatus. An electro-optical layer is contained within the envelope and has an effective local index of refraction at any given location that is determined by a voltage waveform applied across the electro-optical layer at the location. An array of transparent excitation electrodes is disposed over a surface of the transparent envelope. A plurality of control chips are mounted along an edge of the transparent envelope and are coupled to apply control voltage waveforms to the electrodes such that each of the control chips applies the control voltage waveforms to a separate, respective set of the excitation electrodes.

In some embodiments, the plurality of the control chips include at least first and second control chips, which are respectively connected to apply the control voltage waveforms to first and second sets of the excitation electrodes, and the first and second control chips are chained together by conductive traces on the transparent envelope, and the second control chip is configured to select the control voltage waveforms to apply to the second set of the excitation electrodes responsively to commands received via the conductive traces from the first control chip. In one embodiment, the conductive traces define a bus, and the first and second control chips are configured to identify the excitation electrodes and the control voltage waveforms to apply to the identified excitation electrodes responsively to digital address and data values conveyed over the bus.

Additionally or alternatively, the plurality of the control chips are synchronized by a common clock signal, which is conveyed between the control chips by conductive traces on the transparent envelope. In a disclosed embodiment, the clock signal has a clock rate that is variable between a specified high frequency and a specified low frequency, wherein the high frequency is used for conveying updates to the control voltage waveforms between the control chips and the low frequency is used to synchronize the control voltage waveforms when updates are not in progress.

There is moreover provided, in accordance with an embodiment of the invention, an optical method, which includes providing a transparent envelope, which is configured to be mounted in a spectacle frame and worn, in the spectacle frame, in front of an eye of a user, and contains an electro-optical layer having an effective local index of refraction at any given location that is determined by a voltage waveform applied across the electro-optical layer at the location. An array of transparent excitation electrodes is disposed over a first surface of the transparent envelope, and a transparent common electrode is disposed over a second surface of the transparent envelope, opposite the first surface. The common electrode is electrically separated into a central region defining an active area of the electro-optical layer and a peripheral region, which at least partially surrounds the central region. Control circuitry is coupled to hold the central region of the transparent common electrode at a predefined common voltage while allowing the peripheral region to float electrically, and to apply control voltage waveforms to the excitation electrodes, relative to the common voltage, so as to generate a specified phase modulation profile in the active area of the electro-optical layer.

There is furthermore provided, in accordance with an embodiment of the invention, an optical method, which includes positioning a common electrode over an active area on a first transparent substrate. An array of excitation electrodes, including parallel conductive stripes, is extended over the active area on a second transparent substrate. Linear alignment structures are formed in an alignment layer over an inner surface of at least the second transparent substrate, wherein the linear alignment structures are oriented at a 45° angle relative to the conductive stripes. A liquid crystal layer is inserted between the first and second transparent substrates and in contact with the alignment layer, with the first and second transparent substrates in mutually parallel orientations, the liquid crystal layer having an effective local index of refraction at any given location within the active area that is determined by a voltage waveform applied across the liquid crystal layer at the location. Control circuitry is coupled to apply control voltage waveforms to the excitation electrodes, relative to the common electrode, so as to generate a specified phase modulation profile in the active area of the electro-optical layer.

There is also provided, in accordance with an embodiment of the invention, an optical method, which includes providing a transparent envelope, which is configured to be mounted in a spectacle frame in a predefined orientation and worn, in the spectacle frame, in front of an eye of a user, and which curves about an axis that is vertical in the predefined orientation, and which contains an electro-optical layer having an effective local index of refraction at any given location that is determined by a voltage waveform applied across the electro-optical layer at the location. An array of excitation electrodes including parallel transparent conductive stripes is extended across a surface of the transparent envelope in a direction parallel to the vertical axis over an active area of the electro-optical layer. At least one control chip, which is configured to generate control voltage waveforms for application to the electrodes, is mounted on the transparent envelope in a location that is horizontally spaced away from the active area. Conductive traces are connected on the transparent envelope between the at least one control chip and ends of the conductive stripes so as to apply the control voltage waveforms to the electrodes.

There is additionally provided, in accordance with an embodiment of the invention, an optical method, which includes providing a transparent envelope, which is configured to be mounted in a spectacle frame and worn, in the spectacle frame, in front of an eye of a user, and which contains an electro-optical layer having an effective local index of refraction at any given location that is determined by a voltage waveform applied across the electro-optical layer at the location. An array of transparent excitation electrodes is disposed over a surface of the transparent envelope. A plurality of control chips are mounted along an edge of the transparent envelope. The control chips are coupled to apply control voltage waveforms to the electrodes such that each of the control chips applies the control voltage waveforms to a separate, respective set of the excitation electrodes.

The present invention will be more fully understood from the following detailed description of the embodiments thereof, taken together with the drawings in which:

DETAILED DESCRIPTION OF EMBODIMENTS

Overview

Tunable lenses offer major advantages over conventional static lenses in ophthalmic use. For example, tunable spectacle lenses can dynamically adjust their focal lengths for different object distances, as an aid to individuals who have lost their natural ability to accommodate for distance due to presbyopia or aphakia. Tunable spectacle lenses can also adjust their optical power to compensate for eye fatigue and different lighting conditions and can even be shared by different people with different prescriptions. The above-mentioned PCT International Publications WO 2014/049577 and WO 2015/186010, for example, describe technological means that can be applied in producing such lenses and in controlling their focal properties.

Implementation of tunable spectacle lenses, however, requires solving a range of practical problems. For example, the spectacles should have suitable control circuits built in to adjust the focal properties of the lenses on demand. Adjustments should be made with high speed, on the one hand, but minimal power consumption, in order to prolong battery life. Aesthetic appearance is also important, since users of the spectacles will generally prefer that the adaptive spectacles have a surface that appears uniform, resembling conventional static spectacles.

Embodiments of the present invention that are described herein provide optical devices and methods that address these practical needs in implementing spectacles with tunable lenses. In this regard, a number of embodiments with different inventive features are shown in the figures and described below. Although the embodiments are shown and described separately, for the sake of simplicity and clarity, in practice the features of these embodiments can be advantageously combined in the same product. Furthermore, although the embodiments described below use optical phase modulators based on polarization-sensitive liquid crystals, the principles of some of these embodiments may be applied, mutatis mutandis, using other sorts of electro-optical materials, including polarization-insensitive materials as described, for example, in PCT Patent Application PCT/IB2017/051435, filed Mar. 13, 2017, whose disclosure is incorporated herein by reference.

Lenses with Limited Active Areas

Figure 1A:
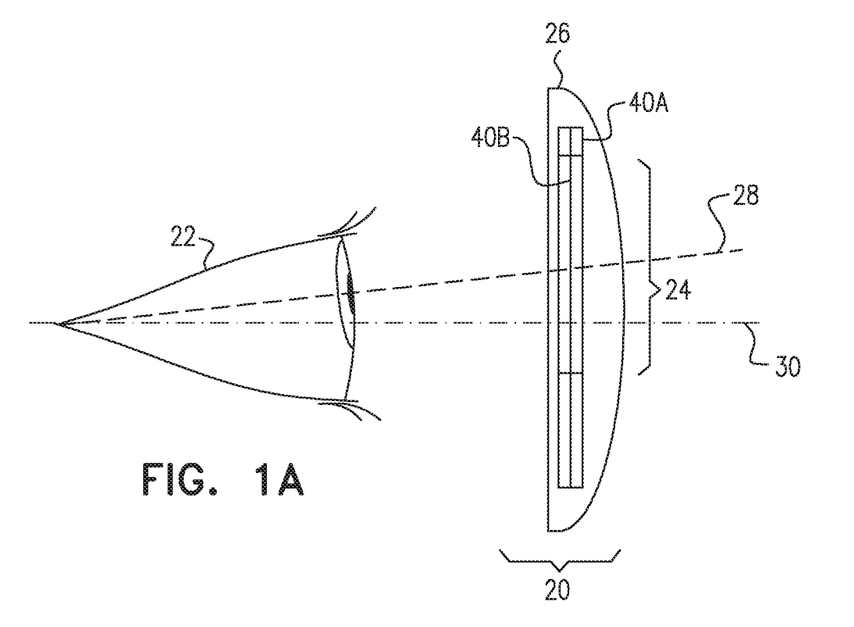
FIG. 1A is schematic sectional view of a tunable ophthalmic lens, in accordance with an embodiment of the present invention.
Figure 1B:
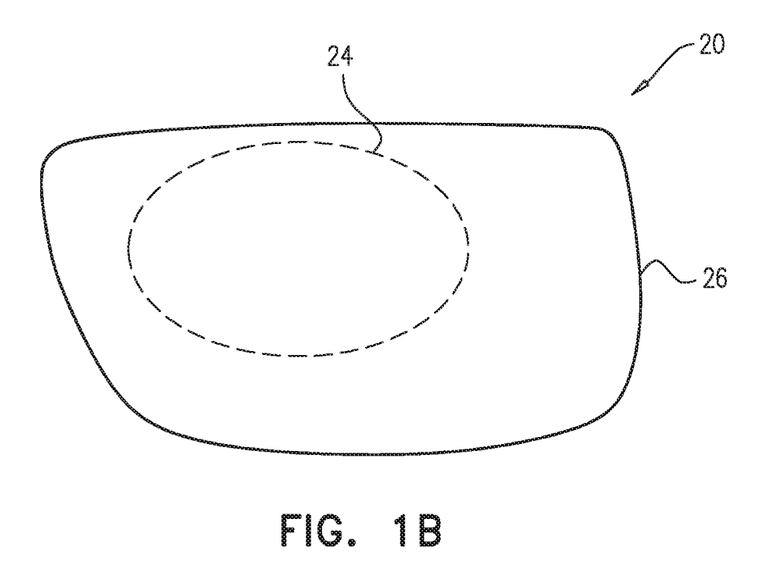
FIG. 1B is a schematic front view of the lens of FIG. 1A, in accordance with an embodiment of the invention.

Reference is now made to FIGS. 1A and 1B, which schematically illustrate a tunable ophthalmic lens 20, in accordance with an embodiment of the invention. FIG. 1A is a sectional view, while FIG. 1B is a frontal view. Lens 20 comprises a transparent envelope 26, which is configured to be mounted in a spectacle frame (not shown) and worn, in the spectacle frame, in front of an eye 22 of a user of the spectacles.

Envelope 26 in the present embodiment contains two optical phase modulators 40A and 40B, whose design and operation are described in greater detail hereinbelow. (These two optical phase modulators are similar in structure and principles of operation, and some of their properties are therefore described hereinbelow with reference to a generic "optical phase modulator 40"; and references to optical phase modulator 40 should be understood as applying to either or both of optical phase modulators 40A and 40B.) Optical phase modulators 40A and 40B are configured to emulate the operation of cylindrical lenses, with respective cylinder axes that are mutually orthogonal. Thus, the superposition of these two optical phase modulators enables lens 20 to generate a specified phase modulation profile in an active area 24 that causes rays of optical radiation that are incident on the active area to converge or diverge with a specified focal power. In this manner, lens 20 can emulate or supplement the operation of a conventional static lens, but with the added features of changing its focal power dynamically, as well as shifting its optical center, for example between axes 28 and 30, in accordance with the movement of eye 22.

As can be seen in FIG. 1A, active area 24 does not extend over the entire area of optical phase modulators 40A and 40B, but rather covers only a smaller central region, surrounded by a peripheral region that is not optically active (although it may have some static optical power due to the shape of lens 20). For most ophthalmic applications, a limited active area of this sort is sufficient, covering between 4 and 10 cm$^2$ out of the total lens area. The remaining area of envelope 26 provides a wider field of view for peripheral vision, over which fine focus is not needed. Limiting the active area in this manner is useful in reducing the electrical complexity and power consumption of lens 20. Although active area 24 is shown in the figure as having an oval shape, in practice the active area may have any convenient sort of shape, such as a circular or rectangular shape.

If optical phase modulators 40A and 40B were to extend only over active area 24, however, lens 20 would have a non-uniform appearance, emphasizing visually the distinction between the central active region and the peripheral region around it. Further for the sake of uniform appearance, it is generally desirable to make electrical connections to optical phase modulators 40A and 40B along the edges of envelope 26. Therefore, in the present embodiment, the optical phase modulators, including their excitation electrodes and common electrodes, extend over most or all of the area of envelope 26, while the actual active region is limited by appropriate configuration of the electrodes, as shown in detail in the figures that follow.

Figure 2:
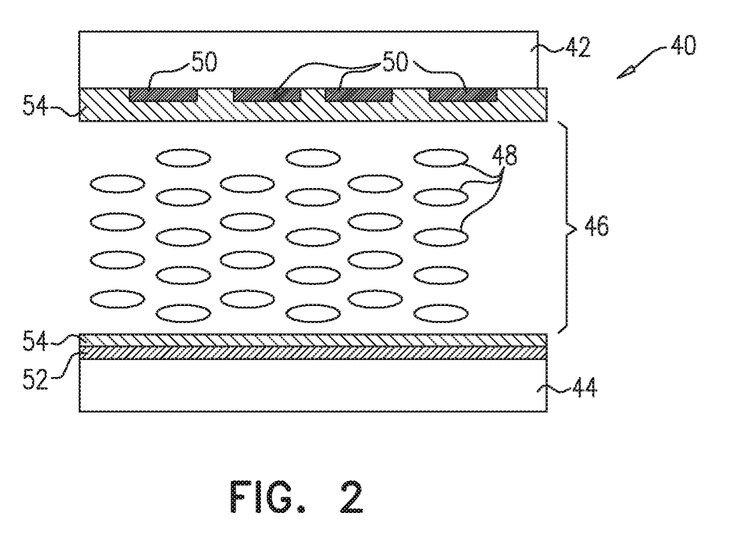
FIG. 2 is a schematic sectional view of an electrically-tunable optical phase modulator, in accordance with an embodiment of the invention.

FIG. 2 is a schematic sectional view of optical phase modulator 40, in accordance with an embodiment of the invention. Optical phase modulator 40 comprises an electro-optical layer 46, sandwiched between an upper substrate 42 and a lower substrate 44, which comprise a transparent material, for example, glass. Layer 46 comprises a liquid crystal material, which is typically contained by suitable encapsulation, as is known in the art. Substrates 42 and 44 can be coated on their insides with a polyimide alignment layer 54 (for example PI-2555, produced by Nissan Chemical Industries Ltd., Japan), which contains linear alignment structures in contact with layer 46, which cause liquid crystal molecules 48 to line up in a desired parallel orientation. The linear alignment structures can comprise actual physical grooves in alignment layer 54, for example, or alternatively molecular structures in the alignment layer that exert electrical aligning forces on the liquid crystal molecules.

Conductive electrodes 50 and 52 are disposed over opposing first and second sides of electro-optical layer 46. Electrodes 50 and 52 comprise a transparent, conductive material, such as indium tin oxide (ITO), as is known in the art, which is deposited on the surfaces of substrates 42 and 44, respectively. (Alternatively, non-transparent excitation electrodes may be used, as long as they are thin enough so that they do not cause disturbing optical effects.) Although for the sake of visual clarity, only a few electrodes are shown in FIG. 2, in practice, for good optical quality, optical phase modulator 40 will typically comprise at least 100 stripe electrodes for excitation, and possibly even 400 or more.

Electrodes 50 in the pictured embodiment are arranged as an array of parallel stripes. On the opposite side of layer 46, electrodes 52 may comprise stripes perpendicular to electrodes 50, which enable control circuitry (such as control chips 72 or 92 or controller 82, shown in FIGS. 5 and 6) to apply two-dimensional voltage patterns across layer 46. Alternatively, electrode 52 may comprise a uniform layer on substrate 44, defining a common electrode capable of serving as an electrical ground plane. In this latter case, only one-dimensional voltage patterns can be applied across layer 46, which can be used to create phase modulation profiles equivalent to cylindrical lenses. As noted above, two such optical phase modulators 40A and 40B in series, with electrodes 50 oriented orthogonally one to the other, can be used in lens 20 to generate two-dimensional optical modulation patterns.

Figure 5:
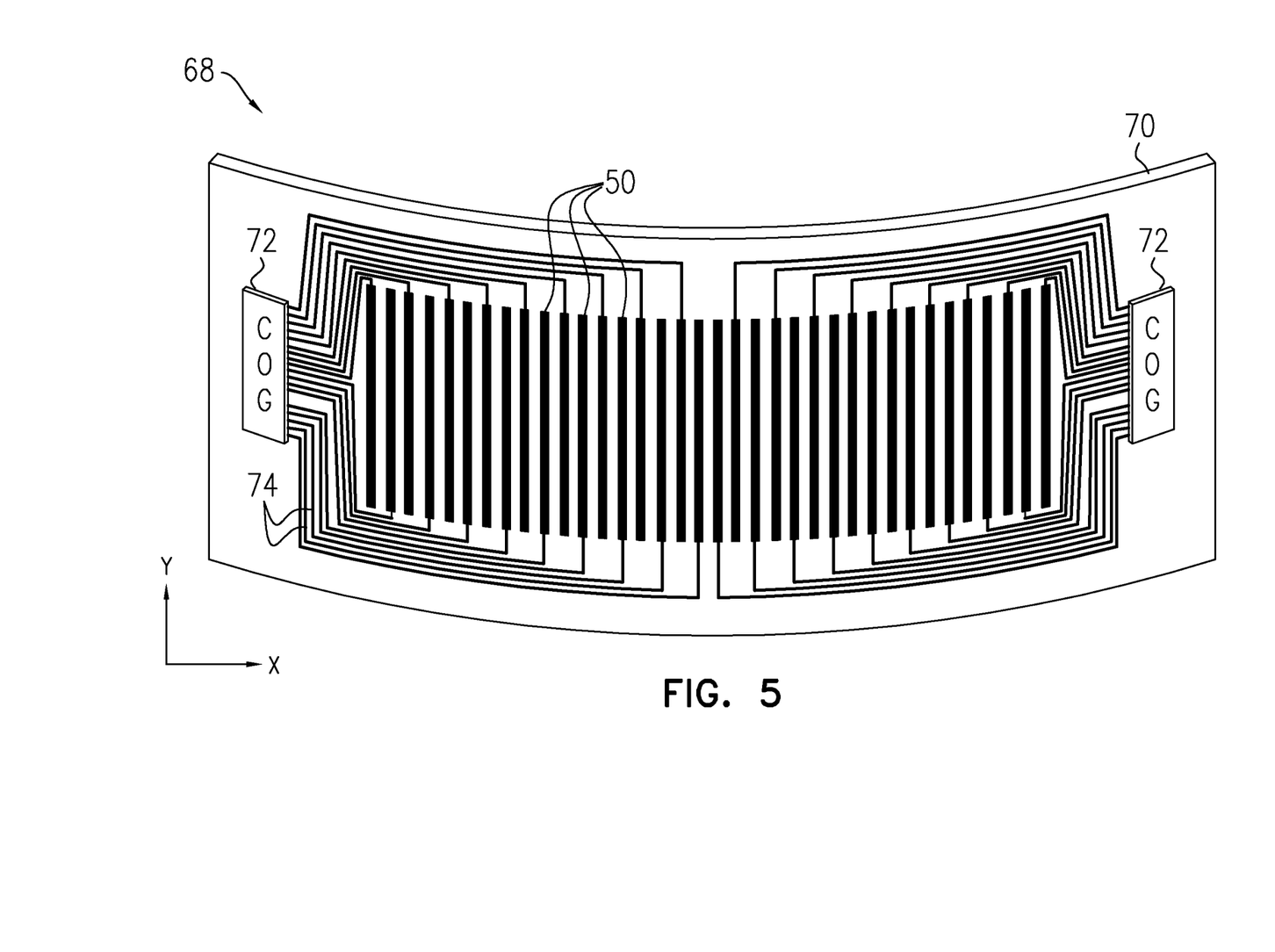
FIG. 5 is a schematic pictorial illustration of a tunable lens showing electrodes and supporting circuits on a surface of the lens, in accordance with an embodiment of the invention.
Figure 6:
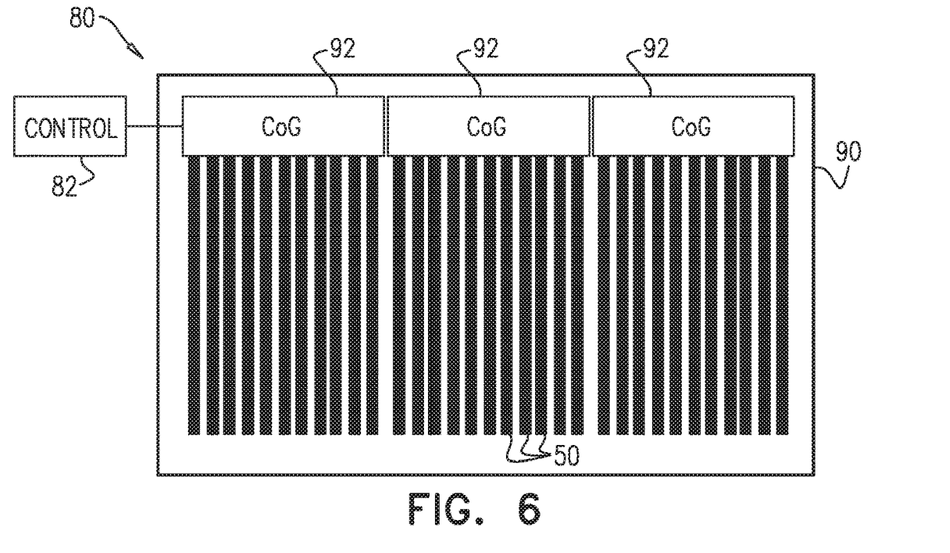
FIG. 6 is a schematic frontal view of a tunable lens, showing electrodes and supporting circuits on a surface of the lens, in accordance with another embodiment of the invention.

Due to the behavior of liquid crystal molecules 48, electro-optical layer 46 has an effective local index of refraction at any given location within the active area of the layer that is determined by the voltage waveform that is applied across the electro-optical layer at that location. Control circuitry (as shown in FIGS. 5 and 6, for example) is coupled to electrodes 50 and 52 and applies the appropriate control voltage waveforms to the electrodes so as to modify the optical phase modulation profile of the electro-optical layer 46. When used in spectacles, such as in lens 20, the phase modulation profile is chosen to cause rays of optical radiation that are incident on optical phase modulator 40 to converge or diverge with a desired focal power. For strong focal power, the phase modulation profile may comprise a Fresnel profile, with sharp peaks and troughs. Alternatively or additionally, the control voltage waveforms may be chosen so as to give rise to a smooth refractive phase modulation profile.

Further details of a variety of electrode structures that can be used in electrically-tunable lenses, as well as the control voltage waveforms that may be applied to such electrodes in order to generate various sorts of phase modulation profiles, are described in the above-mentioned WO 2014/049577 and WO 2015/186010. These details are omitted here for the sake of brevity.

Figure 3A:
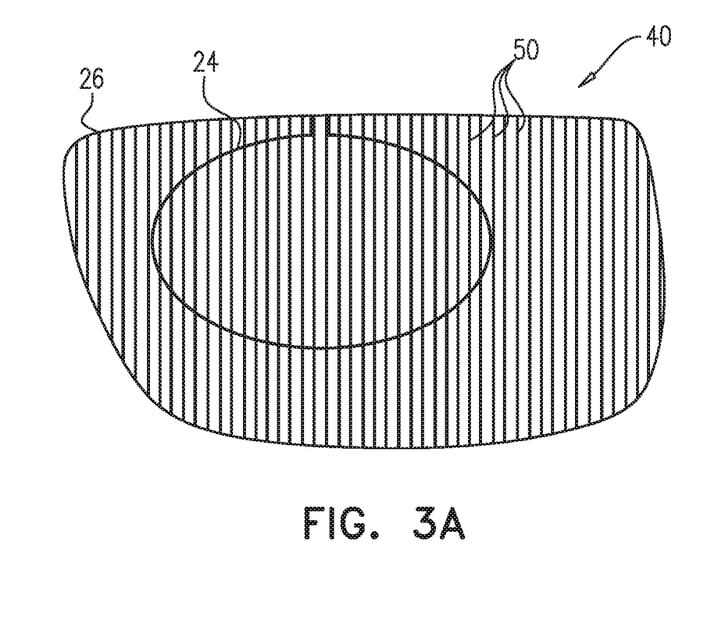
FIGS. 3A and 3B are schematic front and rear views, respectively, of a tunable lens, illustrating a configuration of electrodes of an optical phase modulator embedded in the lens, in accordance with an embodiment of the invention.
Figure 3B:
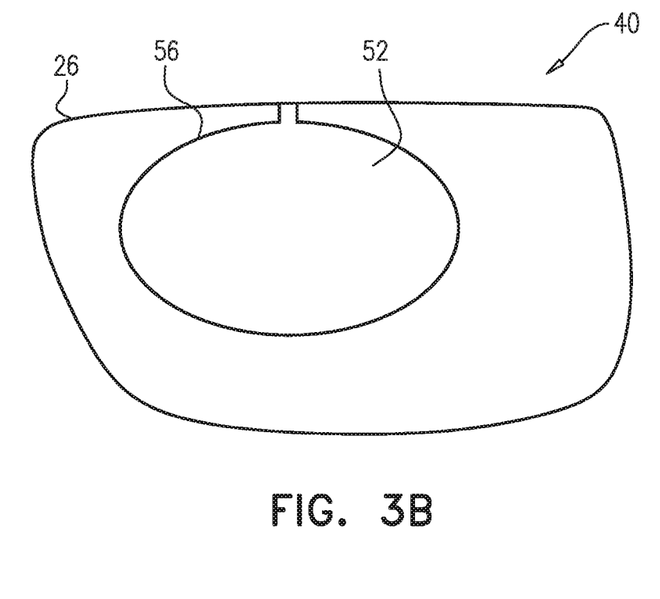

FIGS. 3A and 3B are schematic front and rear views, respectively, of optical phase modulator 40 in tunable lens 20, in accordance with an embodiment of the invention. These figures illustrate the configuration of electrodes 50 and 52, which comprise transparent conductive thin films deposited on opposing surfaces of envelope 26. (These opposing surfaces may be, for example, substrates 42 and 44, respectively, that are a part of envelope 26 or are contained within envelope 26.) For the sake of uniform aesthetic appearance, electrodes 50 and 52 extend over the entire area (or almost the entire area) of envelope 26, as does electro-optical layer 46 between the electrodes.

Electrode 52 is configured as a transparent common electrode, which is etched along an etch line 56 so as to electrically separate the central region defining active area 24 from the peripheral region, which at least partially surrounds the central region. The control circuitry is typically connected only to this central region of electrode 52 and holds the central region at a predefined common voltage (which can be a time-varying common voltage), while the peripheral region is allowed to float electrically and thus does not induce any electro-optical effect in layer 46. The control circuitry applies control voltage waveforms to excitation electrodes 50, relative to the common voltage, for example via electrical connections to the ends of electrodes 50 extending above and below active area 24, and thus generates a specified phase modulation profile in active area 24. Electrodes 50 to the right and left of area 24 need not be connected to the control circuitry (and may even be replaced by a uniform thin film layer as long as this uniform layer has the same visual appearance as the stripes over the central region).

Although FIGS. 3A/B show only a single optical phase modulator 40 with vertical excitation electrodes 50, envelope 26 of lens 20 will generally contain a second optical phase modulator, as well, with horizontal excitation electrodes.

Diagonal Alignment of Liquid Crystals

As explained above with reference to FIG. 2, liquid crystal molecules 48 refract light of a given linear polarization, with the polarization direction determined by the direction of the linear alignment structures (such as grooves, as explained above) in alignment layer 54. (Although polarization-independent electro-optical materials have been demonstrated experimentally in optical phase modulators, such materials are not widely available and suffer from other drawbacks that make them, at this stage, still impractical for commercial use in tunable spectacle lenses.) Therefore, in order to apply two-dimensional phase modulation profiles to incident light, optical phase modulators 40A and 40B in lens 20 should have the same polarization alignment. Lens 20 may also include either a polarizer, to select the direction of polarization that matches optical phase modulators 40A and 40B, or an additional pair of optical phase modulators that will refract the orthogonal direction of polarization.

Figure 4A:
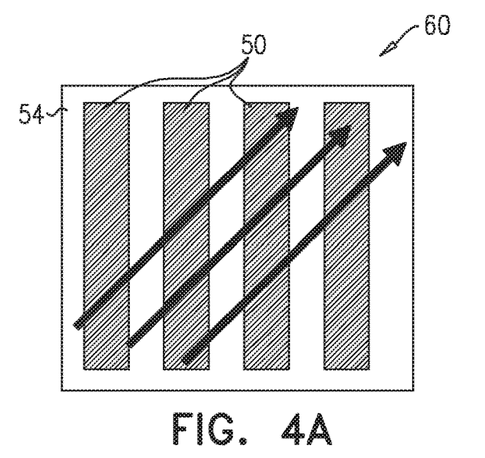
FIGS. 4A-4C are schematic frontal views of substrates on which electrodes of an optical phase modulator are formed, illustrating features of alignment layers that are formed over the electrodes in accordance with an embodiment of the invention.

FIG. 4A is a schematic frontal view of a substrate 60 on which electrodes 50 of an optical phase modulator are formed, illustrating features of alignment layer 54 that is formed over the electrodes in accordance with an embodiment of the invention. Substrate 60 is positioned opposite a substrate (such as substrate 44) on which a common electrode is formed, with electro-optical layer 46 comprising liquid crystal molecules 48 contained between the substrates. As illustrated by the diagonal arrows in FIG. 4A, alignment layer 54 contains grooves (or other linear alignment structures) in contact with the electro-optical layer that are oriented at a 45° angle relative to conductive stripe electrodes. The alignment grooves can be produced, for example, by rubbing machines that are known in the art, such as rubbing machines produced by Holmarc Opto-Mechantronics Pvt. Ltd. (Kerala, India). Liquid crystal molecules 48 will consequently align along this diagonal direction and will refract light with this polarization direction.

As will be illustrated in the figures that follow, this diagonal orientation of alignment layer 54 is useful in simplifying the manufacture of lens 20. Specifically, it permits a single type of substrate, with a single rubbing direction of the alignment layer, to be used in both of optical phase modulators 40A and 40B, rather than requiring two different types, with different rubbing directions (for example, one parallel and the other orthogonal to the electrode direction) as would otherwise be the case.

Figure 4B:
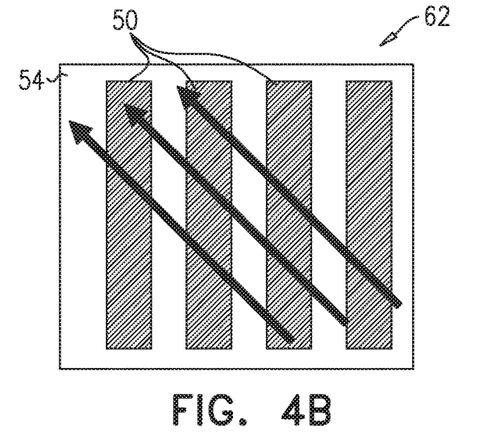
Figure 4C:
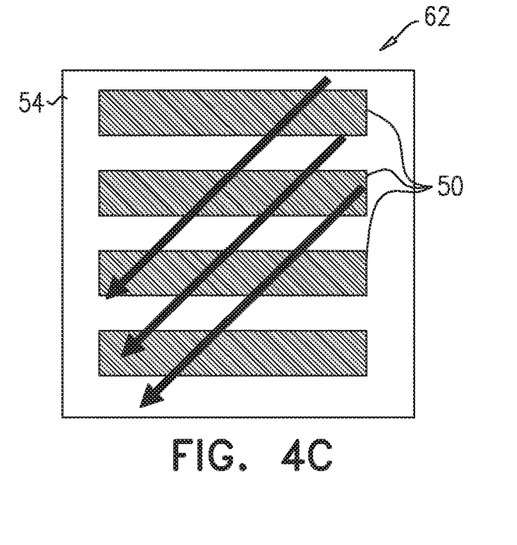

FIGS. 4B and 4C are schematic frontal views of a substrate 62 on which electrodes 50 of an optical phase modulator are formed, illustrating this point. Substrate 62 can be used, for example, in optical phase modulator 40B, which is mounted in mutual proximity with optical phase modulator 40A, with substrates 60 and 62 mutually parallel. For this purpose, stripe electrodes 50 are formed and alignment layer 54 on substrate 62 is rubbed in the same direction as is shown in FIG. 4A. After assembling substrate 62 into optical phase modulator 40B, the phase modulator (and with it substrate 62) is flipped around, as shown in FIG. 4B, i.e., modulator 40B is rotated relative to modulator 40A by 180° about an axis that is parallel to conductive stripes 50. Then optical phase modulator 40B is rotated by 90° about an axis that is perpendicular to substrates 60 and 62, giving the result shown in FIG. 4C.

In this configuration, conductive stripes 50 in optical phase modulators 40A and 40B are now mutually perpendicular, while the grooves (or other linear alignment structures) in alignment layers 54 modulator 40B are parallel to those in the alignment layer in modulator 40A. Thus, both optical phase modulators refract light of the same (diagonal) polarization, while applying cylindrical phase modulation profiles with mutually-orthogonal cylinder axes.

The embodiment shown in FIGS. 4A-C assumes that optical phase modulators 40A/B are square. If the optical phase modulators are rectangular, on the other hand, substrates 60 and 62 will no longer be interchangeable in the manner explained above. The diagonal rubbing technique described above, however, can still be used in reducing the number of different substrate types needed to make a tunable lens that is not polarization dependent from four to two (one with stripe electrodes running parallel to the long side and the other with stripe electrodes parallel to the short side).

Electrode Patterns on Curved Lenses

FIG. 5 is a schematic pictorial illustration of a tunable lens 68 showing excitation electrodes 50 and supporting circuits on a surface of the lens, in accordance with an embodiment of the invention. Lens 68 comprises a transparent envelope 70, which is configured to be mounted in a spectacle frame in the orientation that is shown is the figure, i.e., with the Y-axis that is shown in the figure oriented parallel to the vertical axis of the head of a person wearing the spectacle frame. In this orientation, electrodes 50, comprising parallel transparent conductive stripes, extend across a surface of envelope 70 in the vertical direction, parallel to the Y-axis, over the active area of the electro-optical layer within the envelope (such as liquid crystal layer 46, not shown in this figure). In some embodiments, a transparent common electrode is disposed over another surface of envelope 70, for example as shown in FIG. 3B. Typically, to generate two-dimensional phase modulation profiles, lens 68 comprises an additional set of transparent conductive stripe electrodes extending across the transparent envelope in a direction perpendicular to electrodes 50, but these additional electrodes are omitted from the drawings of this embodiment for the sake of simplicity.

Lens 68 is meant to be worn, in a spectacle frame, in front of an eye of a user. For aesthetic and optical reasons, it is desirable that envelope 70 not be flat, but rather curve about a vertical axis, as in conventional spectacle lenses. (This curvature also facilitates integration of envelope 70 with the body of a lens that has its own fixed optical power, in addition to the tunable power provided by lens 68.) In the pictured embodiment, envelope 70 is shaped as the surface of a cylinder, curving around the vertical cylinder axis. In alternative embodiments (not shown in the figures), the envelope may also have some curvature about a horizontal axis, though generally with a substantially larger axis of curvature than about the vertical axis.

One or more control chips 72 are mounted on transparent envelope 70 in locations that are horizontally spaced away along the X-axis from the active area of lens 68. Chips 72 are connected to the ends of electrodes 50 by respective conductive traces 74. These traces, along with their connection pads for connection to the terminals of chips 72, can be formed on the surface of envelope 70 by thin film deposition and etching processes that are known in the art, either in the same process steps as electrodes 50 or in a separate process. Control chips 72 generate and apply the appropriate control voltage waveforms to electrodes 50 in order to produce the desired phase modulation profile in the active area of lens 68 and to modify the waveforms (and the corresponding profile) as and when required. When multiple control chips are used, as shown in FIG. 5, each of the control chips applies the control voltage waveforms to a separate, respective set of electrodes 50.

One or more of control chips 72 may autonomously select the phase modulation profile, and hence the control voltage waveforms, for example based on sensor inputs and/or user controls. Alternatively or additionally, control chips 72 may applying and modify the control voltage waveforms in response to commands from an external control unit, which may be mounted on the spectacle frames or elsewhere in proximity to the spectacles in which lens 68 is mounted. Spectacles incorporating such sensors and control units are described, for example, in the above-mentioned PCT publications.

The location of control chips 72 at the sides of envelope is useful in accommodating the curvature of envelope 70. In the pictured embodiment, control chips 72 are produced and bonded to the surface envelope 70 in a chip-on-glass (COG) configuration, as is known in the art of flat panel displays, for example. Typically control chips 72 have a rectangular shape, having long and short sides, with multiple terminals along one or both of the long sides in order to provide individual connections to all of electrodes 50. Although it might be considered advantageous to bond control chips 72 in a horizontal orientation above and/or below electrodes 50 in order to shorten traces 74, this location is impractical due to the curvature of envelope 70. Therefore, in the present embodiment, control chips 72 are mounted on transparent envelope 70 with the long sides of the chips parallel to electrodes 50, with the chips in locations that are horizontally spaced away from the electrodes. In these positions, control chips 72 are overlaid on areas of envelope 70 that are nearly flat and thus can more easily be mechanically bonded (for example, by a suitable adhesive) to the surface of the envelope and electrically bonded to traces 74. For instance, assuming chip 72 to have a width of 1 mm along its short side, while envelope has a radius of curvature of 1 m about the vertical axis, the total height variation of the area of the envelope overlaid by the chip is less than 1 µm.

Assuming that another surface of envelope 70 is patterned with horizontal stripe electrodes (not shown), as opposed to the vertical stripes shown in FIG. 5, the curved geometry of the envelope makes it possible to position control chips 72 on this other surface in proximity to the ends of the horizontal stripes, rather than spaced away at the sides as is mandated by the vertical stripes in FIG. 5.

Typically, conductive traces 74 comprise transparent conductors disposed over the surface of transparent envelope 70 between control chips 72 and the ends of electrodes 50. Additionally or alternatively, traces 74 may comprise metal traces (which have higher conductivity and therefore may be made narrower than transparent ITO traces, for example), particularly if these traces are routed along the periphery of envelope 70. As illustrated in FIG. 5, conductive traces 74 may advantageously be routed so as to connect some of the terminals of control chips 72 to the upper ends of one set of conductive stripe electrodes 50 and the remaining terminals to the lower ends of the electrodes in another, disjoint set. The two sets may be interleaved in alternation, as shown in the figure.

After production of envelope 70 in the manner shown in FIG. 5 (together with a common electrode and/or horizontal stripe electrodes on the opposing side, as noted above), the entire envelope is typically encapsulated in a protective transparent coating. This coating may itself be formed as a static lens, thus providing a certain fixed optical power in addition to the variable power of the tunable lens shown in the figure.

Chaining of Control Chips

FIG. 6 is a schematic frontal view of a tunable lens 80, showing transparent excitation electrodes 50 and control chips 92 on a surface of a transparent envelope 90 in the lens, in accordance with another embodiment of the invention. As in the preceding embodiments, envelope contains an electro-optical layer (not shown), such as a liquid crystal layer, and is configured to be incorporated in a spectacle lens and mounted in a spectacle frame. Control chips 92 are mounted along the edge of transparent envelope 90, for example in a COG configuration, and are coupled to apply control voltage waveforms to respective sets of the electrodes. This sort of multi-chip configuration (of which another example was shown in FIG. 5) is advantageous when there is a large number of electrodes to be driven. Furthermore, the use of a modular chip design in this context makes it possible to use the same chip in multiple different tunable lenses of different sizes and shapes, including lenses with different numbers of electrodes. For example, assuming each of chips 92 to be 1 cm long, with terminals spaced apart by a certain pitch, two chips can be concatenated and chained together in order to control a lens with an active area 2 cm wide, while three of the same chips can be concatenated and chained in order to control a lens with an active area 3 cm wide, as long as the pitch of the conductors on envelope 90 matches the pitch of the terminals on the chips in each case.

Control chips 92 receive supply voltages and digital control command, for example from an external controller 82. These electrical inputs can be coupled to chip 92 through a flexible printed circuit (FPC) bonded to the glass (not shown), with conductive traces on the glass connecting the FPC to chips 92. Using a separate FPC for each chip 92 will increase the complexity and the non-transparent areas of lens 80.

Therefore, in some embodiments, control chips 92 are chained together by conductive traces on transparent envelope 90, with one FPC connecting controller 82 to a first chip 92 in the chain, and added functionality in chips 92 in order to directly connect each chip to the next one in the chain. (Metal traces, as opposed to transparent conductive traces, can be advantageous in ensuring low impedance in the connections between the chips, since in any event these traces are outside the active area of lens 80.) In this sort of configuration, the first control chip in the chain may either derive lens parameters and the corresponding control voltage waveforms autonomously, as explained above, or it may receive digital values indicative of the lens or waveform parameters from external controller 82. In addition to the data path, voltage supplies and a clock signal can also be transferred from chip to chip in the chain in order to minimize the device footprint and maximize the transparent area.

The first control chip 92 in the chain applies the appropriate control voltage waveforms to the set of electrodes 50 to which it is connected, and passes commands containing the digital values corresponding to the waveform parameters for the remaining electrodes to the second and subsequent control chips in the chain. For example, seven-bit digital values can be used to encode control voltage waveforms in a scheme using 128 different voltage levels. Based on the digital values, the second and subsequent control chips in the chain can select the control voltage waveforms to apply to their own respective sets of electrodes, thus generating and, as necessary, updating the phase modulation profile applied by lens 80.

Figure 7:
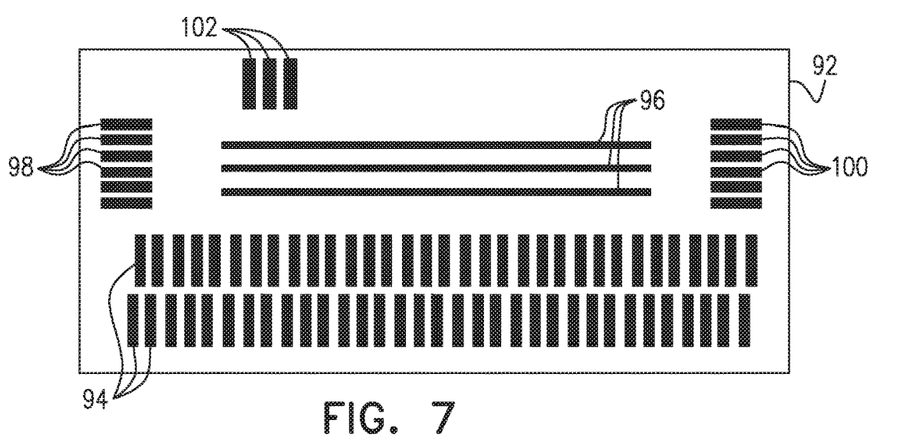
FIG. 7 is a schematic bottom view of terminals on a chip for control of a tunable lens, in accordance with an embodiment of the invention.

FIG. 7 is a schematic bottom view of terminals on control chip 92, in a configuration that supports chaining of the control chips in accordance with an embodiment of the invention. Terminals 94 connect and apply the appropriate control voltage waveforms to respective electrodes 50. Digital values corresponding to the control voltage waveforms are carried along a bus 96 between input bus terminals 98 and output bus terminals 100 to the next chip in the chain. Bus 96 may either be contained internally in chip 92 or use conductive lines that are formed for this purpose on the surface of envelope 90, or use a combination of internal and external lines.

The digital values corresponding to the control voltage waveforms are transmitted along bus 96 together with address values, thus enabling control logic in each chip 92 to select and apply the appropriate digital values in generating the control voltage waveforms for its own set of electrodes, while passing through the remaining digital values transparently. Assuming all of chips 92 to be internally identical, address coding terminals 102 can be used to set a different base address for each chip. Each digital value is thus accompanied on bus 96 by an address value indicating the chip to which it belongs and the particular electrode terminal 94 to which the corresponding voltage waveform is to be applied.

Figure 8:
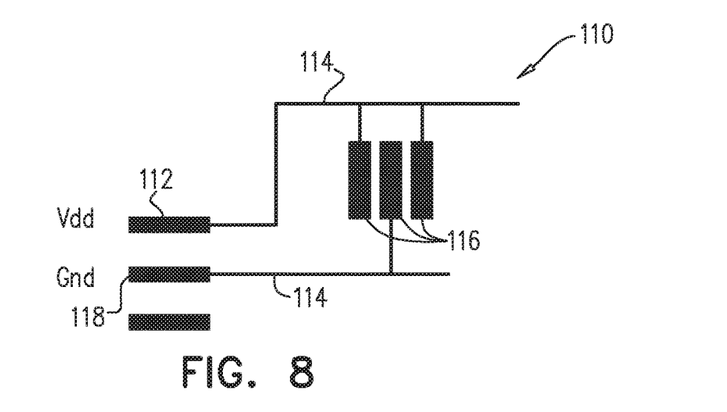
FIG. 8 is a schematic detail view of terminals and traces on a tunable lens for connection to a control chip, in accordance with an embodiment of the invention.

FIG. 8 is a schematic detail view of an address setting circuit 110, which is formed on the surface of envelope 90 in order to set the base address of a given control chip 92 in accordance with an embodiment of the invention. Connection pads 116 connect to address coding terminals 102 when chip 92 is mounted on the pad, and the voltage values applied to pads 116 indicate the base address to the logic circuits in the chip. In the present example, traces 114 connect a Vdd input 112 (logical '1') to the first and third pads 116 and a ground input 118 (logical '0') to the center pad 116, thus indicating that the base address is '101' (i.e., the three most significant bits of the address range assigned to the chip are set to 101). The other chips have different base addresses and thus different configurations of address setting circuit 110. One address, for example 0, can be used as a "broadcast" address, to send commands to all chips in the chain simultaneously.

Alternatively, other addressing schemes can be used, as are known in the art. For example, a bit mask can be used to indicate the base address of each chip, with a single pad in the mask set to the value '1' (different for each chip), and the rest '0'. In this case, each address value will be transmitted over bus 96 with a mask value having a '1' in the appropriate position to indicate the chip to which it is directed. The chips will disregard all commands in which the appropriate mask bit is not set. This approach makes it possible to address multiple chips in the same command.

Similarly to the address terminals in chips 92 and the respective address setting in circuit 110, an additional terminal in the chip can be used to define the direction of the data flow in the chain of chips. For example, if this terminal is configured to '1' on the surface of the envelope, terminals 98 will be regarded as inputs to the chip and terminals 100 will be regarded as outputs, while configuring this terminal to '0' will result in terminals 98 and 100 being regarded as outputs and inputs respectively.

Because the control voltage waveforms applied to electrodes 50, as well as the common voltage applied to the common electrode on the other surface of transparent envelope 90, use alternating currents (AC), all of control chips 92 should be synchronized by a common clock signal. This clock signal can be conveyed between the control chips by conductive traces on envelope 90, either via one of the lines of bus 96 or via a separate clock trace (not shown).

During updates to the control voltage waveforms, it is desirable that the data values corresponding to the update be transmitted over bus 96 at a high clock rate so that updates can be implemented with minimal latency. On the other hand, during the periods between updates, a lower clock rate is sufficient, and is actually preferred in order to reduce power consumption. For this purpose, the clock rate of the clock signal can be varied between a specified high frequency, for conveying updates to the control voltage waveforms between control chips 92, and a specified low frequency when updates are not in progress. For example, a clock rate of 20 MHz can be used during updates for rapid data transfer, and can then be reduced during periods between updates to the AC frequency of the control voltage waveforms, which is typically no more than a few hundred Hertz. In this latter case the clock signal is used only to synchronize the AC cycle of the chips, and not as a clock for logic gates.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Optical apparatus, comprising:
a transparent envelope configured to be mounted in a spectacle frame and worn, in the spectacle frame, in front of an eye of a user of the apparatus;
an electro-optical layer, contained within the envelope and having an effective local index of refraction at any given location that is determined by a voltage waveform applied across the electro-optical layer at the location;
an array of transparent excitation electrodes disposed over a first surface of the transparent envelope;
a transparent conductive thin film, which is disposed over a second surface of the transparent envelope, opposite the first surface, and includes a central region defining an active area of the electro-optical layer and a peripheral region, which at least partially surrounds the central region and is electrically separated from the central region; and
control circuitry, which is configured to hold the central region of the transparent conductive thin film at a predefined common voltage while allowing the peripheral region to float electrically, and to apply control voltage waveforms to the excitation electrodes, relative to the common voltage, so as to generate a specified phase modulation profile in the active area of the electro-optical layer.

2. The apparatus according to claim 1, wherein the phase modulation profile is specified so as to cause rays of optical radiation that are incident on the active area to converge or diverge with a specified focal power.

3. The apparatus according to claim 1, wherein the electro-optical layer comprises a liquid crystal.

4. The apparatus according to claim 1, wherein the transparent excitation electrodes comprise conductive stripes, which extend across both the central and peripheral regions.

5. The apparatus according to claim 4, wherein the electro-optical layer comprises first and second electro-optical layers contained within the envelope, and wherein the conductive stripes comprise a first set of the stripes that extend in parallel across the first electro-optical layer in a first direction and a second set of the stripes, which extend in parallel across the second electro-optical layer in a second direction, which is perpendicular to the first direction.

6. The apparatus according to claim 1, wherein the transparent thin film is etched to separate the central region from the peripheral region.

7. An optical device, comprising:
first and second transparent substrates in mutually parallel orientations;
a liquid crystal layer contained between the first and second transparent substrates and having an effective local index of refraction at any given location within an active area of the liquid crystal layer that is determined by a voltage waveform applied across the liquid crystal layer at the location;
a common electrode, positioned over the active area on the first transparent substrate;
an array of excitation electrodes, comprising parallel conductive stripes extending over the active area on the second transparent substrate;
an alignment layer, which is formed over an inner surface of at least the second transparent substrate and contains linear alignment structures in contact with the liquid crystal layer that are oriented at a 45° angle relative to the conductive stripes; and
control circuitry, which is configured to apply control voltage waveforms to the excitation electrodes, relative to the common electrode, so as to generate a specified phase modulation profile in the active area of the electro-optical layer.

8. The device according to claim 7, wherein the phase modulation profile is specified so as to cause rays of optical radiation that are incident on the active area to converge or diverge with a specified focal power.

9. Optical apparatus comprising first and second devices according to claim 7, mounted in mutual proximity with the first and second transparent substrates of the first and second devices mutually parallel,
wherein the second device is rotated, relative to the first device, so that the conductive stripes in the first and second devices are mutually perpendicular while the linear alignment structures in the alignment layer in the first device are parallel to the linear alignment structures in the alignment layer in the second device.

10. The apparatus according to claim 9, wherein the second device is rotated relative to the first device by 180° about a first axis that is parallel to the conductive stripes and by 90° about a second axis that is perpendicular to the transparent substrates.

11. Optical apparatus, comprising:
a transparent envelope, which is configured to be mounted in a spectacle frame that is to be worn in front of an eye of a user of the apparatus, wherein the transparent envelope curves about an axis of curvature that is parallel to a vertical axis of the head of the user wearing the spectacle frame;
an electro-optical layer, contained within the envelope and having an effective local index of refraction at any given location that is determined by a voltage waveform applied across the electro-optical layer at the location;
an array of excitation electrodes comprising parallel transparent conductive stripes extending across a surface of the transparent envelope in a direction parallel to the axis of curvature over an active area of the electro-optical layer;
at least one control chip, which is mounted on the transparent envelope in a location that is spaced away from the active area in a direction perpendicular to the axis of curvature and is configured to generate control voltage waveforms for application to the electrodes;
conductive traces, which are disposed on the transparent envelope and connect the at least one control chip to ends of the conductive stripes so as to apply the control voltage waveforms to the electrodes; and
a transparent common electrode, which is disposed over a second surface of the transparent envelope, opposite the first surface, and is electrically separated into a central region defining an active area of the electro-optical layer and a peripheral region, which at least partially surrounds the central region,
wherein the central region of the transparent common electrode is held at a predefined common voltage while allowing the peripheral region to float electrically.

12. The apparatus according to claim 11, wherein the electro-optical layer comprises a liquid crystal.

13. The apparatus according to claim 11, wherein the conductive traces comprise transparent conductors disposed over the surface of the transparent envelope between the at least one control chip and the ends of the electrodes.

14. The apparatus according to claim 11, wherein the conductive traces comprise first conductive traces connecting first terminals of the at least one control chip to respective upper ends of a first set of the conductive stripes and second conductive traces connecting second terminals of the at least one control chip to respective lower ends of a second set of the conductive stripes.

15. The apparatus according to claim 11, wherein the at least one control chip has rectangular shape having long and short sides and is mounted on the transparent envelope with the long sides parallel to the conductive stripes.

16. The apparatus according to claim 11, wherein the array of excitation electrodes comprises further transparent conductive stripes connected to the at least one control chip and extending across the transparent envelope in a direction perpendicular to the vertical axis.

17. Optical apparatus, comprising:
a transparent envelope configured to be mounted in a spectacle frame and worn, in the spectacle frame, in front of an eye of a user of the apparatus;
an electro-optical layer, contained within the envelope and having an effective local index of refraction at any given location that is determined by a voltage waveform applied across the electro-optical layer at the location;
an array of transparent excitation electrodes disposed over a surface of the transparent envelope; and
a plurality of control chips, which are mounted along an edge of the transparent envelope and are coupled to apply control voltage waveforms to the electrodes such that each of the control chips applies the control voltage waveforms to a separate, respective set of the excitation electrodes,
wherein the plurality of the control chips comprise at least first and second control chips, which are respectively connected to apply the control voltage waveforms to first and second sets of the excitation electrodes, and
wherein the first and second control chips are chained together by conductive traces on the transparent envelope, and wherein the second control chip is configured to select the control voltage waveforms to apply to the second set of the excitation electrodes responsively to commands received via the conductive traces from the first control chip.

18. The apparatus according to claim 17, wherein the electro-optical layer comprises a liquid crystal.

19. The apparatus according to claim 17, wherein the transparent electrodes comprise multiple parallel conductive stripes.

20. The apparatus according to claim 17, wherein the conductive traces define a bus, and wherein the first and second control chips are configured to identify the excitation electrodes and the control voltage waveforms to apply to the identified excitation electrodes responsively to digital address and data values conveyed over the bus.

21. The apparatus according to claim 17, wherein the plurality of the control chips are synchronized by a common clock signal, which is conveyed between the control chips by conductive traces on the transparent envelope.

22. The apparatus according to claim 21, wherein the clock signal has a clock rate that is variable between a specified high frequency and a specified low frequency, wherein the high frequency is used for conveying updates to the control voltage waveforms between the control chips and the low frequency is used to synchronize the control voltage waveforms when updates are not in progress.

23. An optical method, comprising:
providing a transparent envelope, which is configured to be mounted in a spectacle frame and worn, in the spectacle frame, in front of an eye of a user, and contains an electro-optical layer having an effective local index of refraction at any given location that is determined by a voltage waveform applied across the electro-optical layer at the location;
disposing an array of transparent excitation electrodes over a first surface of the transparent envelope and a transparent conductive thin film over a second surface of the transparent envelope, opposite the first surface;
electrically separating the conductive thin film into a central region defining an active area of the electro-optical layer and a peripheral region, which at least partially surrounds the central region; and
coupling control circuitry to hold the central region of the transparent conductive thin film at a predefined common voltage while allowing the peripheral region to float electrically, and to apply control voltage waveforms to the excitation electrodes, relative to the common voltage, so as to generate a specified phase modulation profile in the active area of the electro-optical layer.

24. The method according to claim 23, wherein the phase modulation profile is specified so as to cause rays of optical radiation that are incident on the active area to converge or diverge with a specified focal power.

25. The method according to claim 23, wherein the electro-optical layer comprises a liquid crystal.

26. The method according to claim 23, wherein the transparent excitation electrodes comprise conductive stripes, which extend across both the central and peripheral regions.

27. The method according to claim 26, wherein the electro-optical layer comprises first and second electro-optical layers contained within the envelope, and wherein the conductive stripes comprise a first set of the stripes that extend in parallel across the first electro-optical layer in a first direction and a second set of the stripes, which extend in parallel across the second electro-optical layer in a second direction, which is perpendicular to the first direction.

28. The method according to claim 23,
wherein electrically separating the conductive thin film comprises etching the conductive thin film to separate the central region from the peripheral region.

29. An optical method, comprising:
positioning a common electrode over an active area on a first transparent substrate;
extending an array of excitation electrodes, comprising parallel conductive stripes, over the active area on a second transparent substrate;
forming linear alignment structures in an alignment layer over an inner surface of at least the second transparent substrate, wherein the linear alignment structures are oriented at a 45° angle relative to the conductive stripes;
inserting a liquid crystal layer between the first and second transparent substrates and in contact with the alignment layer, with the first and second transparent substrates in mutually parallel orientations, the liquid crystal layer having an effective local index of refraction at any given location within the active area that is determined by a voltage waveform applied across the liquid crystal layer at the location; and
coupling control circuitry to apply control voltage waveforms to the excitation electrodes, relative to the common electrode, so as to generate a specified phase modulation profile in the active area of the electro-optical layer.

30. The method according to claim 29, wherein the phase modulation profile is specified so as to cause rays of optical radiation that are incident on the active area to converge or diverge with a specified focal power.

31. An optical method, comprising:
producing first and second optical devices according to the method of claim 29; and
mounting the first and second optical devices in mutual proximity with the first and second transparent substrates of the first and second optical devices mutually parallel,
wherein the second optical device is rotated, relative to the first optical device, so that the conductive stripes in the first and second optical devices are mutually perpendicular while the linear alignment structures in the alignment layer in the first optical device are parallel to the linear alignment structures in the alignment layer in the second optical device.

32. The method according to claim 31, wherein the second optical device is rotated relative to the first optical device by 180° about a first axis that is parallel to the conductive stripes and by 90° about a second axis that is perpendicular to the transparent substrates.

33. An optical method, comprising:
providing a transparent envelope, which is configured to be mounted in a spectacle frame that is to be worn in front of an eye of a user of the apparatus, wherein the transparent envelope curves about an axis of curvature that is parallel to a vertical axis of the head of the user wearing the spectacle frame, and which contains an electro-optical layer having an effective local index of refraction at any given location that is determined by a voltage waveform applied across the electro-optical layer at the location;
extending an array of excitation electrodes comprising parallel transparent conductive stripes across a surface of the transparent envelope in a direction parallel to the axis of curvature over an active area of the electro-optical layer;
mounting at least one control chip, which is configured to generate control voltage waveforms for application to the electrodes, on the transparent envelope in a location that is spaced away from the active area in a direction perpendicular to the axis of curvature;
connecting conductive traces on the transparent envelope between the at least one control chip and ends of the conductive stripes so as to apply the control voltage waveforms to the electrodes;
disposing a transparent common electrode over a second surface of the transparent envelope, opposite the first surface;
electrically separating the transparent common electrode into a central region defining an active area of the electro-optical layer and a peripheral region, which at least partially surrounds the central region; and
holding the central region of the transparent common electrode at a predefined common voltage while allowing the peripheral region to float electrically.

34. The method according to claim 33, wherein the electro-optical layer comprises a liquid crystal.

35. The method according to claim 33, wherein connecting the conductive traces comprise transparent depositing conductors over the surface of the transparent envelope between the at least one control chip and the ends of the electrodes.

36. The method according to claim 33, wherein connecting the conductive traces comprise connecting first conductive traces between first terminals of the at least one control chip and respective upper ends of a first set of the conductive stripes and connecting second conductive traces connecting between second terminals of the at least one control chip and respective lower ends of a second set of the conductive stripes.

37. The method according to claim 33, wherein the at least one control chip has rectangular shape having long and short sides and is mounted on the transparent envelope with the long sides parallel to the conductive stripes.

38. The method according to claim 33, and comprising extending further transparent conductive stripes across the transparent envelope in a direction perpendicular to the vertical axis, and connecting the further transparent conductive stripes to the at least one control chip.

39. An optical method, comprising:
providing a transparent envelope, which is configured to be mounted in a spectacle frame and worn, in the spectacle frame, in front of an eye of a user, and which contains an electro-optical layer having an effective local index of refraction at any given location that is determined by a voltage waveform applied across the electro-optical layer at the location;
disposing an array of transparent excitation electrodes over a surface of the transparent envelope;
mounting a plurality of control chips along an edge of the transparent envelope; and
coupling the control chips to apply control voltage waveforms to the electrodes such that each of the control chips applies the control voltage waveforms to a separate, respective set of the excitation electrodes,
wherein the plurality of the control chips comprise at least first and second control chips, which are respectively connected to apply the control voltage waveforms to first and second sets of the excitation electrodes, and
wherein coupling the control chips comprises chaining the first and second control chips together by conductive traces on the transparent envelope, and conveying commands via the conductive traces from the first control chip to the second control chip, wherein the second control chip selects the control voltage waveforms to apply to the second set of the excitation electrodes responsively to the commands.

40. The method according to claim 39, wherein the electro-optical layer comprises a liquid crystal.

41. The method according to claim 39, wherein disposing the transparent electrodes comprises depositing multiple parallel conductive stripes over the surface of the envelope.

42. The method according to claim 39, wherein the conductive traces define a bus, and wherein conveying the commands comprises identifying the excitation electrodes and the control voltage waveforms to apply to the identified excitation electrodes in digital address and data values conveyed over the bus.

43. The method according to claim 39, and comprising synchronizing the plurality of the control chips by a common clock signal, which is conveyed between the control chips by conductive traces on the transparent envelope.

44. The method according to claim 43, wherein synchronizing the plurality of the control chips comprises varying a clock rate of the clock signal between a specified high frequency and a specified low frequency, wherein the high frequency is used for conveying updates to the control voltage waveforms between the control chips and the low frequency is used to synchronize the control voltage waveforms when updates are not in progress.

* * * * *